United States Patent Office

3,796,731
Patented Mar. 12, 1974

3,796,731
EPOXY SUBSTITUTED PHOSPHONATES
John B. Siddall, Palo Alto, Calif., and Jean Pierre Calame, Locarno, Switzerland, assignors to Zoecon Corporation, Palo Alto, Calif.
No Drawing. Application July 14, 1969, Ser. No. 841,609, now Patent No. 3,694,526, which is a continuation-in-part of application Ser. No. 800,267, Feb. 18, 1969, which in turn is a continuation-in-part of application Ser. No. 618,321, Feb. 24, 1967, both now abandoned. Divided and this application Mar. 19, 1971, Ser. No. 126,267
Int. Cl. C07f 9/38
U.S. Cl. 260—348 R
10 Claims

ABSTRACT OF THE DISCLOSURE

Hydrocarbon phosphonates containing from 12 to 13 carbon atoms in the hydrocarbon backbone chain and lower alkyl substituents at the C–3, 7 and 11 positions and unsaturation or saturation between C–2, 3, C–6,7 and C–10,11 and/or substituents at each of positions C–2,3, 6,7,10 and 11 which are arthropod maturation inhibitors.

---

This is a division of Ser. No. 841,609, filed July 14, 1969, now U.S. Pat. 3,694,526 which is a continuation-in-part of Ser. No. 800,267, filed Feb. 18, 1969, now abandoned, which, in turn, is a continuation-in-part of Ser. No. 618,321, filed Feb. 24, 1967, now abandoned.

The present invention relates to novel organic compounds and to processes for their preparation.

More specifically, the present invention pertains to certain compounds that inhibit maturation of arthropods and to the processes for the preparation of such compounds.

The compounds of the present invention are represented by the following structural Formulas XIV and XVI:

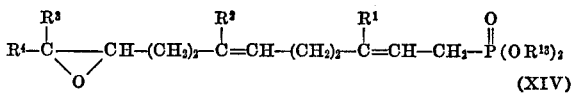

(XIV)

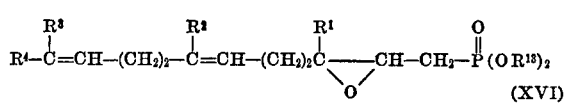

(XVI)

wherein each of $R^1$, $R^2$, $R^3$ and $R^4$ is methyl or ethyl and $R^{13}$ is lower alkyl or phenyl.

The term "lower alkyl" refers to an alkyl group having a chain length of one to six carbon atoms.

The presence of double bonds and epoxide groupings gives rise to geometric isomerism in the configuration of these compounds.

This isomerism occurs with regard to the double bond, and the epoxide grouping bridging the C–2,3 carbon atoms, the C–6,7 atoms and the C–10,11 atoms. Obviously, isomerism at the C–10,11 carbon atoms occurs only when $R^3$ and $R^4$ are different alkyl groups. The isomers are the cis and trans of the monoene series; the cis,cis; cis,trans; trans,cis; and trans,trans of the diene series; and the eight isomers of the triene series; each of which isomers in each series being included within the scope of this invention. Each of these isomers are separable from the reaction mixture by which they are prepared by virtue of their different physical properties via conventional techniques, such as chromatography, including thin-layer and gas-liquid chromatography, as described in more detail hereinafter.

The compounds of this invention are arthropod maturation inhibitors. They possess the ability to inhibit the maturation of members of the phylum Arthropoda, particularly insects, in the passage from one metamorphic stage to the next metamorphic stage. Thus, in the case of insects passing from the embryo stage to the larva stage, thence to the pupa stage and thence to the adult stage, contact with an effective amount of a compound of the present invention, at any of the first three stages, inhibits passage to the next developmental stage with the insect either repeating passage through its present stage or dying. Moreover, these compounds exhibit ovicidal properties with insects and accordingly are useful in combating insects. These compounds are very potent and thus can be used at extremely low levels, e.g., from $10^{-6}$ to $10^{-9}$ g. and are thus advantageously administered over large areas in quantities suitable for the estimated insect population. Generally, the substances are liquids and for the purposes herein described, they can be utilized in conjunction with liquid or solid carriers. Typical insects against which these compounds are effective include mealworm, housefly, boll weevil, corn borer, mosquito, cockroach, moth, and the like.

Although not intending to be limited by any theoretical explanation, it appears that the effectiveness of these derivatives can be traced to their ability to mimic the activity of certain so-called "juvenile hormone" substances such as those described in U.S. Pat. No. 2,981,655 (Williams) and Law et al., Proc. Nat. Acad. Sci., 55, 576 (1966). Because of the potency of the compounds of the present invention, they can be employed in extremely low concentrations, as noted above, to obtain reproducible predetermined level of activities. Juvenile hormone substances have been referred to as growth hormone also. Juvenile hormone was identified as methyl 10,11-oxido-7-ethyl-3,11-trimethyltrideca-2,6-dienoate using an extract of cecropia moths by Roeller et al., Angew. Chem. Internat. Edit., 6, 179 (February 1967) and Chemical & Engineering News, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones From the Cecropia Silk Moth," Zoology (Proc. N.A.S.) 60, 853 (1968). In addition to the natural juvenile hormones and the unidentified mixture of Law et al. above, some synthetic terpenoids have been reported to exhibit juvenile hormone activity—Bowers et al., Life Sciences (Oxford), 4, 2323 (1965)—methyl 10,11-oxido-3,7,11-trimethyldodeca-2,6-dienoate; Williams et al., Journal of Insect Physiology, 11, 569 (1965); BioScience 18, No. 8, 791 (August 1968); Williams, Scientific American 217, No. 1, 13 (July 1967); Science 154, 248 (Oct. 14, 1966); Romanuk et al., Proc. Nat. Acad. Sci., 57, 349 (February 1967)—7,11-dichloro of esters of farnesoic acid—Canadian Pat. 795,805 (1968); Masner et al., Nature, 219, 395 (July 27, 1968); and U.S. Pat. 3,429,970—farnesene derivatives.

The phosphonates of the present invention can be prepared from a tri-unsat. phosphonate of Formula X using m-chlorobenzoic acid, preferably in methylene chloride or chloroform as a solvent.

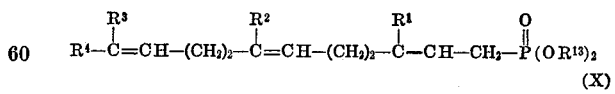

(X)

The compounds of Formula X are described in copending Ser. No. 841,609, now U.S. Pat. 3,694,526, the disclosure of which is incorporated by reference.

The following examples will serve to further typify the nature of this invention. As these are presented solely for the purpose of illustration, they should not be construed as a limitation on the scope of this invention.

EXAMPLE

A solution of 2.5 g. of diethyl 3,7,11-trimethyltrideca-2,6,10-trienyl phosphonate in 100 ml. of chloroform is cooled to 0° C. and mixed with a solution of 1.1 molar equivalents of m-chloroperbenzoic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield a mixture of diethyl 3,7,11-trimethyl-2,3-oxidotrideca-6,10-dienyl phosphonate; diethyl 3,7,11-trimethyl-6,7-oxidotrideca-2,10-dienyl phosphonate and diethyl 3,7,11-trimethyl-10,11-oxidotrideca-2,6-dienyl phosphonate. Similarly, by utilizing 2.1 molar equivalents of m-chloroperbenzoic acid, the following are obtained: diethyl 3,7,11-trimethyl-2,3;6,7-bisoxidotridec-10-enyl phosphonate; diethyl 3,7,11-trimethyl-2,3;10,11-bisoxidotridec-6-enyl phosphonate and diethyl 3,7,11 - trimethyl-6,7;10,11-bisoxidotridec-2-enyl phosphonate. By utilizing 3.1 molar equivalents of m-chloroperbenzoic acid, diethyl 3,7,11-trimethyl-2,3;6,7;10,11-trisoxidotridecyl phosphonate is obtained. The above compounds are isolated by gas-liquid chromatography.

By the same process, the 2,3-oxido, 6,7-oxido, 10,11-oxido, 2,3;6,7-bisoxido, 2,3;10,11-bisoxido, 6,7;10,11-bisoxido and 2,3;6,7;10,11-trisoxido adducts of diethyl 3,7,11-trimethyldodeca-2,6,10-trienyl phosphonate, dimethyl 3,7,11-trimethyltrideca-2,6,10-trienyl phosphonate, diethyl 3,11 - dimethyl-7-ethyltrideca-2,6,10-trienyl phosphonate and dimethyl 3,11 - dimethyl-7-ethyltrideca-2,6,10-trienyl phosphonate are prepared by using the latter compounds as starting materials.

What is claimed is:

1. A compound selected from those of the Formula XIV or XVI:

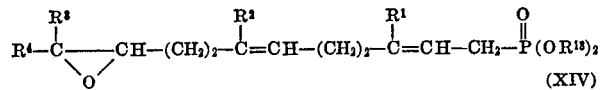

(XIV)

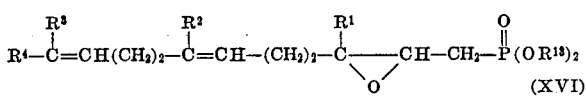

(XVI)

wherein each of $R^1$, $R^2$, $R^3$ and $R^4$ is methyl or ethyl and $R^{13}$ is lower alkyl or phenyl.

2. A compound according to Formula XIV of claim 1 wherein each of $R^1$, $R^2$ and $R^3$ is methyl and $R^4$ is methyl or ethyl.

3. A compound according to claim 2 wherein $R^{13}$ is methyl or ethyl.

4. A compound according to claim 3 wherein $R^{13}$ is ethyl.

5. A compound according to Formula XIV of claim 1 wherein each of $R^1$ and $R^3$ is methyl and each of $R^2$ and $R^4$ is ethyl.

6. A compound according to claim 5 wherein $R^{13}$ is methyl or ethyl.

7. A compound according to Formula XVI of claim 1 wherein each of $R^1$, $R^2$ and $R^3$ is methyl and $R^4$ is methyl or ethyl.

8. A compound according to Formula XVI of claim 1 wherein each of $R^1$ and $R^3$ is methyl and each of $R^2$ and $R^4$ is ethyl.

9. A compound according to claim 7 wherein $R^{13}$ is methyl or ethyl.

10. A compound according to claim 8 wherein $R^{13}$ is methyl or ethyl.

No references cited.

NORMA S. MILESTONE, Primary Examiner

U.S. Cl. X.R.

424—278, Dig. 12